(12) United States Patent
Pannell

(10) Patent No.: US 9,100,325 B2
(45) Date of Patent: *Aug. 4, 2015

(54) CONTROLLING A NETWORK CONNECTION STATUS INDICATOR

(71) Applicant: Marvell International Ltd., Hamilton (BM)

(72) Inventor: Donald Pannell, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 245 days.

This patent is subject to a terminal disclaimer.

(21) Appl. No.: 13/657,539

(22) Filed: Oct. 22, 2012

(65) Prior Publication Data

US 2013/0046886 A1 Feb. 21, 2013

Related U.S. Application Data

(63) Continuation-in-part of application No. 12/581,068, filed on Oct. 16, 2009, now Pat. No. 8,296,421.

(60) Provisional application No. 61/107,843, filed on Oct. 23, 2008.

(51) Int. Cl.
*G06F 15/173* (2006.01)
*H04L 12/26* (2006.01)
*H04L 12/24* (2006.01)

(52) U.S. Cl.
CPC ............... *H04L 43/18* (2013.01); *H04L 41/22* (2013.01)

(58) Field of Classification Search
USPC .................. 709/203, 217, 223, 224; 361/730; 370/249
See application file for complete search history.

(56) References Cited

U.S. PATENT DOCUMENTS

| 5,553,240 | A | 9/1996 | Madduri | |
|---|---|---|---|---|
| 5,732,224 | A | 3/1998 | Gulick et al. | |
| 7,092,362 | B1* | 8/2006 | Demakakos et al. | 370/249 |
| 7,730,230 | B1 | 6/2010 | Kondapalli | |
| 8,135,853 | B1 | 3/2012 | Khan | |
| 8,296,421 | B1 | 10/2012 | Pannell | |
| 2006/0280131 | A1* | 12/2006 | Rahman et al. | 370/256 |
| 2008/0134300 | A1 | 6/2008 | Izatt | |
| 2008/0298447 | A1 | 12/2008 | Yoo et al. | |
| 2009/0010178 | A1* | 1/2009 | Tekippe | 370/254 |
| 2009/0202250 | A1 | 8/2009 | Dizechi et al. | |

(Continued)

OTHER PUBLICATIONS

"Draft Standard for a Precision Clock Synchronization Protocol for Networked Measurement and Control Systems", Precise Network Clock Synchronization Working Group of the IM/ST Committee; IEEE P1588 D2.2; The Institute of Electrical and Electronics Engineers, Inc., New York, NY, 2007, 299 pages.

(Continued)

*Primary Examiner* — Joseph E Avellino
*Assistant Examiner* — Marshall McLeod

(57) ABSTRACT

This disclosure describes techniques for restricting activity of a status indicator if a received data unit is determined to be a protocol control unit that is selected for filtering. In one embodiment, a method is described that comprises receiving a data unit from a network, determining whether the received data unit is a protocol control unit, and restricting activity of a status indicator if the received data unit is determined to be the protocol control unit, or allowing activity of the status indicator if the received data unit is determined to be data other than the protocol control unit.

18 Claims, 10 Drawing Sheets

(56) References Cited

U.S. PATENT DOCUMENTS

2009/0284934 A1* 11/2009 Nielsen et al. ............. 361/730
2009/0310726 A1 12/2009 Alankry et al.

OTHER PUBLICATIONS

"Final Office Action", U.S. Appl. No. 12/581,068, Oct. 20, 2011, 9 pages.
"Non-Final Office Action", U.S. Appl. No. 12/270,482, Apr. 28, 2011, 6 pages.
"Non-Final Office Action", U.S. Appl. No. 12/270,482, May 26, 2010, 7 pages.
"Non-Final Office Action", U.S. Appl. No. 12/270,482, Nov. 12, 2010, 8 pages.
"Non-Final Office Action", U.S. Appl. No. 12/581,068, May 4, 2011, 9 pages.
"Notice of Allowance", U.S. Appl. No. 12/581,068, Jun. 18, 2012, 4 pages.
"Notice of Allowance", U.S. Appl. No. 12/270,482, Oct. 25, 2011, 7 pages.
"Timing and Synchronization for Time-Sensitive Applications in Bridged Local Area Networks", Interworking Task Group of IEEE 802.1; Draft standards for Local and Metropolitan Area Networks—P802.1AS/D0.8; The Institute of Electrical and Electronics Engineers, Inc.; New York, NY, May 25, 2007, 149 pages.

\* cited by examiner

CONTROLLING A NETWORK CONNECTION STATUS INDICATOR

RELATED APPLICATIONS

This application is a continuation in part of, and claims priority to, U.S. application Ser. No. 12/581,068, filed Oct. 16, 2009, incorporated herein by reference in its entirety, which claims priority from and incorporates by reference U.S. Provisional Patent Application Ser. No. 61/107,843 filed Oct. 23, 2008, the disclosure of which is incorporated by reference herein in its entirety.

BACKGROUND

The background description provided herein is for the purpose of generally presenting the context of the disclosure. Unless otherwise indicated herein, the approaches described in this section are not prior art to the claims in the present disclosure and are not admitted to be prior art by inclusion in this section.

Light-emitting diodes (LEDs) are used to indicate various status information by blinking or maintaining an on or off state. For example, LEDs are used to indicate data flow and/or link status for a communication link between devices in a network. A single LED can indicate that no communication link is established by remaining off, a link has been successfully established but no data is flowing by remaining on, and a link is established and data is flowing by blinking.

In some networks, packets or frames (e.g., Ethernet frames) include timing control information to allow for timing across various network components to be synchronized by having a time concept communicated across the network. For example, networks used for coordinated factory operations, or those synchronizing sound with video (e.g., audio/video bridging (AVB)) or with other audio channels, use such timing controls so that each device knows when to play the sound or when to move an actuator. However, drawbacks of LED link status indicators where such timing protocols are used include a loss of distinction between indications of normal data flow and those related to a protocol.

SUMMARY

This summary is provided to introduce subject matter that is further described below in the Detailed Description and Drawings. Accordingly, this Summary should not be considered to describe essential features nor used to limit the scope of the claimed subject matter.

In one embodiment, a method is described that comprises receiving a data unit from a network, determining whether the received data unit is a protocol control unit, and restricting activity of a status indicator if the received data unit is determined to be the protocol control unit, or allowing activity of the status indicator if the received data unit is determined to be data other than the protocol control unit.

In another embodiment, a controller is described that comprises a receiver configured to receive a data unit from a network, logic configured to determine whether the received data unit is a protocol control unit, logic configured to restrict activity of a status indicator if the received data unit is determined to be the protocol control unit, and logic configured to allow the activity of the status indicator if the received data unit is determined to be data other than the protocol control unit.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical items.

DETAILED DESCRIPTION

To accommodate networks aiming to maintain network timing synchronization across various network devices, a time concept may be communicated across the network via data units (e.g., frames, packets, etc.). The data units can have a fixed or variable length, depending on the data transmission protocol employed. One such way to communicate a time concept is by using precise timing protocol (PTP), which is IEEE standard 802.1AS (a profile under IEEE 1588 version 2). In general, any suitable protocol or approach for conveying timing information can be employed in particular embodiments. For example, the present circuitry and method(s) can be applied to any Layer 2 and/or IEEE 802.1 protocol frames. Thus, as described herein, the term "protocol" or "protocol control unit" may refer to timing protocols such as precise timing protocols (PTP), IEEE 1588 protocol frames, IEEE 802.1 protocol frames and so forth. In any event, such a timing protocol can include conveying a 'time' concept by using standard frames (e.g., Ethernet frames), packets, etc., such that various stations or devices within or on the network are made aware of the network time.

Figure 1:
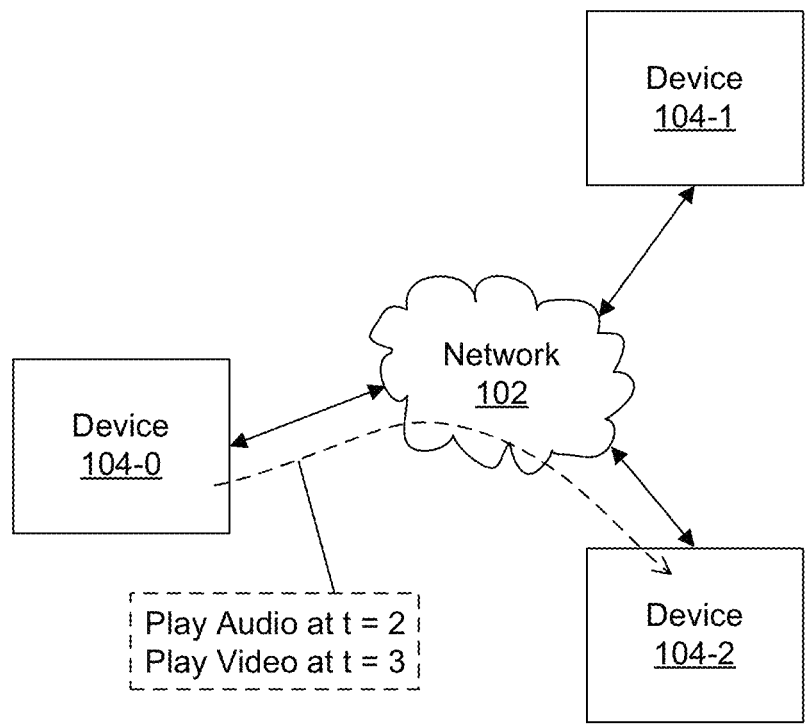
FIG. 1 illustrates an example timing protocol application in a network environment.

FIG. 1 illustrates an example 100 of a timing protocol application in a network environment. In this example, a network 102 and devices (e.g., 104-0, 104-1, and 104-2) may be used for coordinated factory operations, or those synchronizing sound with video (e.g., audio/video bridging (AVB)) or with other audio channels, to use such timing controls to know when to play the sound or when to move an appropriate actuator. In operation, timing protocols (e.g., PTPs) can periodically send timing protocol frames from one device (e.g., 104-0) to another device (e.g., 104-2) in the network.

These timing protocol frames can be used to communicate a network time to each participating device 104 on the network in order to capture local arrival and departure times of the protocol frames. In each device 104, the local arrival time of a timing protocol frame (e.g., as determined using time stamping logic) can be compared to a time at which the protocol (e.g., PTP) indicates the timing protocol frame should have arrived at the device. This time difference can then be used to adjust local clocks on the receiving device (e.g., 104-2) to be synchronized with those of transmitting device 104-0. In addition, the more often the timing protocol runs or sends such timing protocol frames between devices or components, the more accurate the corresponding time synchronization. For example, a protocol exchange between devices 104 can range from about 1/sec to about 100/sec, where such protocol exchanges can each include multiple timing protocol frames. While the protocol exchanges might occur fairly often and regularly, these timing protocol frames can be relatively small as compared to data or other control frames, such that the presence of such timing control frames passing through network 102 may not have an appreciable effect on network bandwidth.

Figure 2:
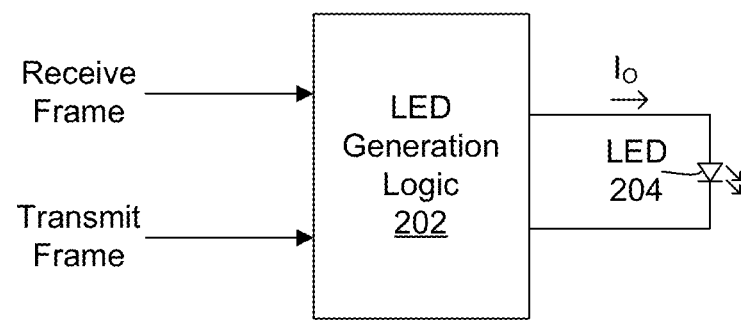
FIG. 2 illustrates an example light-emitting diode (LED) controller system.

FIG. 2 illustrates an example 200 of a light-emitting diode (LED) controller system. Many physical layer devices (e.g., Ethernet PHY devices) and switches support generation of one or more LED controls (e.g., current $I_O$ control via LED generation logic 202) on each physical port on the device. For example, one LED communication function is to indicate that a link or a successful connection of a cable from one device/box to another device/box has been established such that data can flow over that network cable. Another LED communication function is to indicate an activity, such as transmission or reception of data over the cable. For example, these functions can be combined into a single LED 204 operation, as shown below in Table 1.

TABLE 1

| LED State: | Communication Function: |
| --- | --- |
| Off | No link established |
| On | Link established, but no data flowing |
| Blinking at X rate | Link established and data flowing |

The blinking of an LED to indicate link activity enables network administrators or end users to determine that a job or application is actually flowing through the network. Constant or ongoing LED blinking, however, can be an indication of a severe network problem, such as a bridge loop that can result in inaccurate frame forwarding. In another LED activity indication, LED blinking that stops for short times while otherwise blinking most of the time can be an indication of an overloaded network. Further, periodic bursts of LED blinking with relatively long intervals of no blinking can indicate a healthy network that is working fine and is not overloaded.

Various network states can be communicated using a relatively small number of LEDs. However, timing protocols (e.g., PTPs) as well as other existing and future IEEE 802.1 protocol frames can alter the network activity communications capabilities of LEDs, because such protocols can be run sufficiently frequently (e.g., from about 1/sec to about 100/sec, or more, per port) to result in a corresponding LED continuously blinking whenever these protocols are running. Because such constant, regular blinking can be interpreted as an indication of a severe network problem, some confusion can result upon introduction of such protocols into a network. Also, different protocols may cause different effects on LED activity. For example, a "spanning tree" managed network protocol may only utilize one timing frame per second per port. As a result, an associated indicator LED may blink relatively slowly. However, some protocols, such as PTPs, may utilize 10-100 frames per second per port causing the LED activity to resemble normal data traffic.

Figure 3:
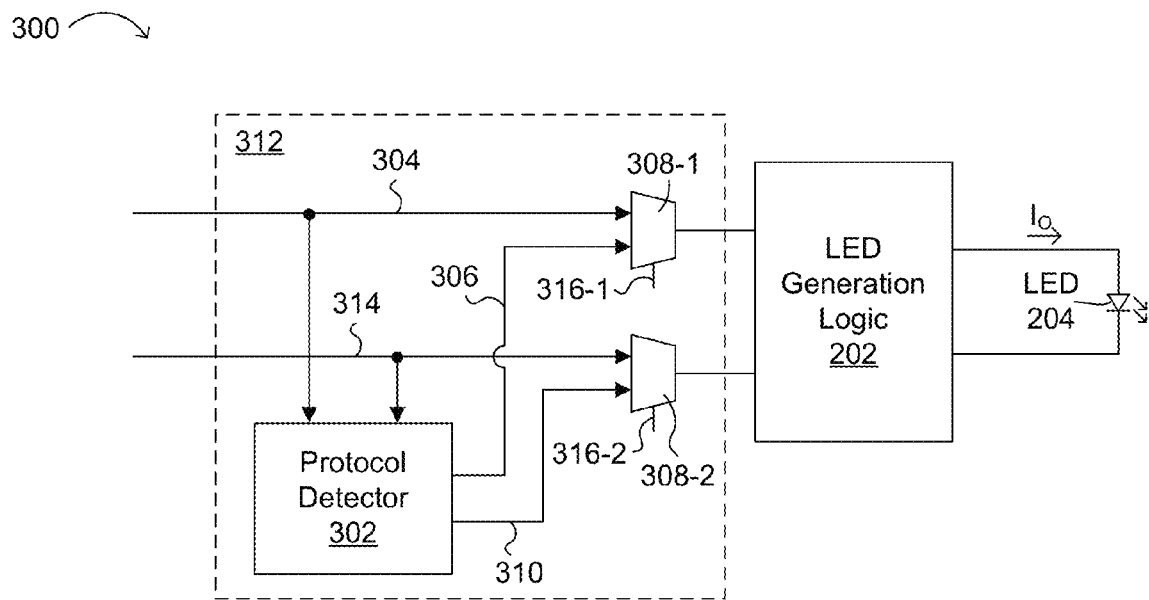
FIG. 3 illustrates an example LED controller configured for network protocols.

FIG. 3 illustrates an example 300 of an LED controller configured for network protocols. This particular example illustrates a network protocol filtering or restriction mode approach whereby timing protocol related frames and/or other IEEE 802.1 protocol frames can be restricted from participating in LED operation. In this example, LED filtering logic 312 is configured to mask selected protocol related frames from LED activity generation. In some embodiments, the filtering logic enables a partial restriction mode approach that allows selected protocol related frames to participate in LED operation, but at a different (e.g., reduced) rate to allow for appropriate functional communications. This partial restriction mode or enhanced filtering operation can be selected by a user, and will be discussed in more detail below. Further, while examples herein are related to protocols, the described embodiments may also be used in any system that checks or monitors link or connection activity that can be related to or indicated by the activity of an LED or other status indicator.

Figure 4:
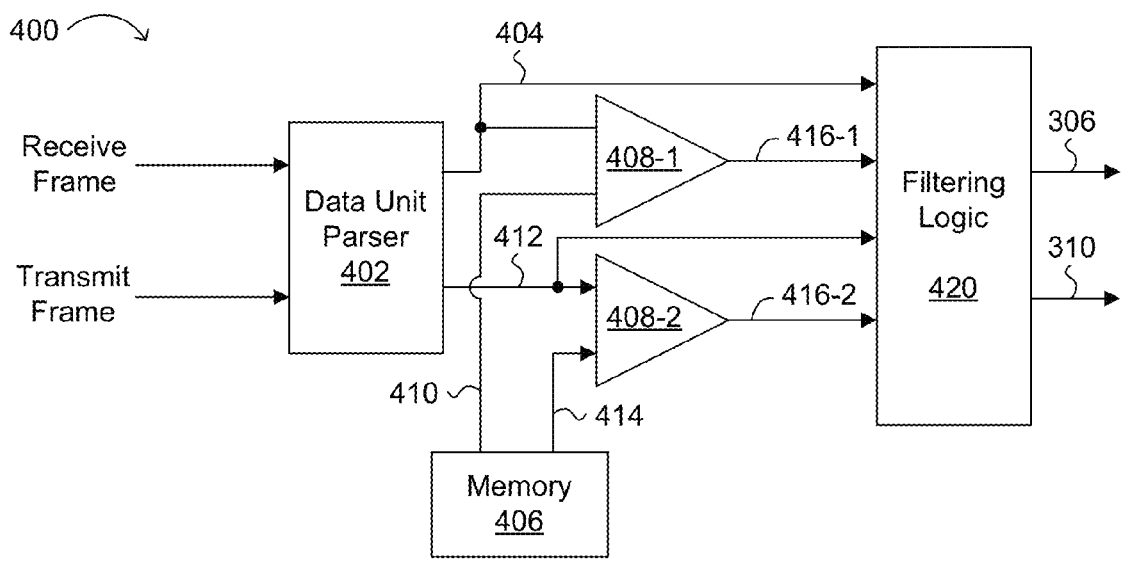
FIG. 4 illustrates an example protocol detector.

In FIG. 3, a protocol detector 302 detects any frames or other data units of a protocol received or transmitted over the network. As shown in FIG. 4, protocol detector 302 can include a data unit parser 402, a memory unit 406, comparators 408-1 and 408-2, and filtering logic 420, although any suitable components and/or arrangements (such as, e.g., components in conventional time-stamping logic) can be used in various embodiments. For example, data unit parser 402 is configured to parse various fields (e.g., receive field 404 and transmit field 412, as well as other fields described in FIGS. 6-8 and the discussions thereof) from the received or transmitted frame or data unit. The parsed or selected field(s) 404, 412 (e.g., at predetermined positions in the received or transmitted data unit) can be compared (e.g., using bit-for-bit comparators 408-1 and 408-2) against a predetermined value 410 or 414 stored in the memory unit 406. A comparison match may indicate that the received data unit is a protocol frame, such as by bringing signal 416-1 or 416-2 high. Examples of such fields and frame structures are shown below in FIGS. 6, 7, and 8.

Filtering logic 420 is configured to receive protocol match signals 416-1 and 416-2 along with the parsed or selected receive field 404 and transmit field 412. When a comparator 408-1 or 408-2 determines that the current frame is a protocol frame to be filtered, then filtering logic 420 can be implemented to remove the current frame from the 'connection activity' or frame presence signal 306 or 310 to the LED Generation Logic 202. In one embodiment, filtering logic 420 includes one or more delay elements configured to delay the parsed or selected receive field 404 and transmit field 412. Such a delay may be at least as long as the sum of the time for the data unit parser 402 to receive a field indicating that the current frame is a protocol frame and the time delay of the comparator 408-1 or 408-2. Alternatively, the filtering logic 420 can be configured to indicate connection activity at the end of a frame or other data unit, rather than at the beginning of the frame or other data unit. When the comparator 408-1 or 408-2 determines that the current frame is not a frame to be filtered (e.g., the current frame is not a protocol frame), then filtering logic 420 outputs an active 'connection activity' or frame presence signal 306 or 310.

Returning to the example of FIG. 3, to indicate the connection status and network activity over the connection to LED generation logic 202, multiplexer 308-1 selects the 'connection activity' or frame presence signal 306 or a receive frame 304, and multiplexer 308-2 selects the 'connection activity' or frame presence signal 310 or a transmit frame 314, as an input to the LED generation logic 202. Thus, the protocol detector 302 activity can be selected independently for receive data units and transmit data units. In one approach, multiplexers 308-1 and 308-2 are configured to select (e.g., using one or more memory or configuration bits 316-1, 316-2) outputs 306 and 310 from the protocol detector 302, respectively representing receive frames and transmit frames with the protocol frames filtered out as described with regard to FIG. 4. All other frames can cause the LED 204 to blink (via LED generation logic 202). This approach may be particularly suitable for applications where LED activity generation logic 202 and network time stamping logic (not shown) are contained in the same device. However, this approach can also be used for other device configurations and arrangements. In this fashion, network activity indicator LEDs can function substantially similarly to network activity indicator LEDs in non-timing protocol networks by operating as shown above in Table 1 for data traffic (non-timing protocol traffic), regardless of any occurrences of any protocol frames.

The LED activity generation logic 202 can be implemented in a network port's physical layer (PHY) device. Alternatively, the LED activity generation logic 202 can be implemented via the port's switch media access control (MAC) logic. LED 204 can be implemented to blink when receive or transmit activity is detected at the port by the PHY, MAC, or any other suitable logic or other circuitry. Further, protocol time stamping logic used to register arrival and/or departure time of the protocol frames for time stamping can also be placed into the PHY, MAC, or other device/location (e.g., in a register and/or latch at an input to a comparator). For example, a PHY configured for gigabit operations can be able to capture a time stamp of every frame at an accuracy rate of about 125 MHz per wire or link. In addition to the protocol time stamping logic detecting which frames to time stamp, this logic can also be used detect protocol frames that are selected for filtering. As will be discussed below with reference to FIG. 6, timing protocol frame detection (e.g., in IEEE 802.1AS) can be performed by examining the frame's Ether type and corresponding sub type. And as will be discussed below with reference to FIG. 7, other fields (e.g., defined in IEEE 1588) of the frame can be examined to determine whether a frame is a timing protocol frame. As will be discussed below with reference to FIG. 8, IEEE 802.1 protocol frame detection can be performed by examining the frame's destination address.

Figure 5:
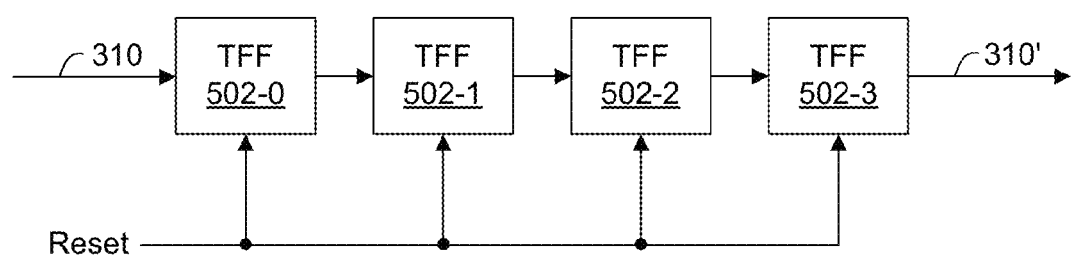
FIG. 5 illustrates an example counter circuit for a partial restriction mode.

Referring back to FIG. 3, in a partial restriction mode or enhanced protocol filtering mode LED filtering logic 312 may be modified such that a corresponding network activity indicator LED (e.g., LED 204) indicates whether a protocol (e.g., PTP) is running on a port or not. For example, the number of timing protocol frames that are being filtered to associated LED activity logic can be counted, and then 1 out of every N occurrences can be allowed through (e.g., not filtered). For example, an embodiment of an example counter 500 is shown in FIG. 5, where "trigger" flip-flops (TFFs 502-0, 502-1, 502-2, and 502-3) are used in an asynchronous ripple counter configuration. A reset input can be used to reset counter 500, e.g., upon power-up, or based on other reset controls (such as output 310' changing to an active state).

Other types of counters (e.g., synchronous), as well as other types of counting components (e.g., other types of flip-flops, etc.) can also be used in particular embodiments. It is to be noted that while only four counter stages are shown in this particular example, any number of stages can be employed. The number of stages can be based on the value of N. In one embodiment, the predetermined value of N can be programmed by a user into a register. Further, each stage 502 can be separately enabled (not shown) based on the programmed N value. In any event, a modified signal 310' can replace signal 310 of FIG. 3, or otherwise be combined (e.g., via logic gates) with signal 310 (e.g., to generate a pulse), as part of LED filtering logic 312.

In some applications, such a 1 out of N non-filtering function can be performed in the transmit direction, and not necessarily in the receive direction. User-programming can also be used to enable or disable this directional filtering function, such as by enabling the protocol frame filtering in only the transmit direction, only the receive direction, or in both receive and transmit directions. Some applications can enable the filtering in only the transmit direction by enabling a local central processing unit (CPU) to control a rate at which protocol frames are sent out a port. The receive rate for PTP frames, however, may not be as easily controlled. Control over the transmit rate allows the non-filtering function to occur at regular intervals such that a combined link and transmission activity LED can have the functions as shown below in Table 2.

TABLE 2

| LED State: | Communication Function: |
| --- | --- |
| Off | No link established |
| On | Link established, but no data flowing, and no protocol running |
| Blinking at Y rate | Link established with protocol running, but no other data flowing |
| Blinking at X rate | Link established and data flowing |

In this fashion, the LED 204 can blink at a rate of Y Hz, where Y is a value that is user-programmable (e.g., by programming a count value of N via a register). For example, the value of Y can be approximately 0.2 Hz to 2 Hz. This technique is applicable to timing frame detection when no other data is flowing. The regular blinking essentially provides a relatively slow and steady 'heart beat' to indicate that protocol (e.g., PTP) frames are flowing for proper timing protocol operation. The LED blinks relatively fast (e.g., at a rate of X Hz, where X is greater than Y) to indicate the presence of non-protocol frames (e.g., data traffic) flowing. For example, X can be approximately 2 Hz to 10 Hz. The blink rates and patterns can match the non-timing protocol data traffic flow rates as for the non-protocol case (e.g., as shown above in Table 1, where X is the same blinking rate as in Table 1).

In some embodiments, a protocol control block, for example including LED filtering logic 312, can filter protocol frames receive and transmit activity to the receive and transmit activity inputs of a PHY or MAC device. Each protocol frame can be filtered or otherwise restricted, and not only the protocol frames that are time-stamped. The PHY may already include logic to control activity of the LED (e.g., stretching, blinking, etc.) and that can combine signals indicating receive and transmit activity at the PHY to the indicator LED (or transmit indicator LED, or receive indicator LED, etc.). As such, the logic and the PHY can be modified to allow this receive and transmit to be provided, alternatively or additionally, from a protocol (e.g., PTP) block, such as for time stamping logic, etc., elsewhere in the system.

A protocol block (e.g., 302) can be configured to determine which frames are protocol frames or protocol-related frames, and which frames are of other types (e.g., data traffic). Those frames that are not protocol-related can be allowed to energize, enable, or otherwise activate transmit and/or receive activity indications for an indicator LED by passing control signals into the PHY, as would be done for a non-protocol system (e.g., as shown above in Table 1). Thus, a "normal" LED activity control can occur for non-protocol-related frames. This can be the case even if the frames have cyclic redundancy check (CRC) errors, or the frames are runts (incomplete frames/packets), etc., such that all non-protocol frames can be indicated just as for non-protocol networks in the LEDs associated with the PHY. Additionally, while the additional logic (e.g., LED filtering logic 312) that detects protocol frames, etc., may result in a slight time delay (e.g., via paths in timing protocol detector 302, as well as any counters (e.g., 500) and associated logic (e.g., gates 304, 308, etc.)) in activating an LED, this time delay may not be noticeable to a user because the LEDs are stretched substantially longer than this delay.

In some situations, such as the in full restriction mode, the LEDs can be fully inactive even when the protocol is running. This could make it appear to a user that the protocol is not up and running when the protocol is in fact operational. An enhanced or partially restricted mode can be enabled to accommodate this case whereby one out of every N (1/N) protocol frames can be allowed through to transmit or receive activity lines to the PHY to turn on the LEDs. User-programmable registers can be used to enable partial or full restriction mode, as well as to set the value of N for partial restriction mode. For example, a default value of 0x80 (128 as converted from hexadecimal format) can be set as N, and N can be user-programmable to be changed to any positive integer value. For the default case where N=128, 1 out of every 128 protocol transmit frames can cause the corresponding port's indicator LED to blink, or otherwise contribute to the blinking control. However, N can be any integer from 2 (e.g., 3, 4, 8, etc.) to 32, 64, 256, $10^3$, $10^4$, or more, depending on the frame transmission rate, the frame size, and/or the blinking rate X of the LED when the link is established and data is flowing. It should be noted that the 1/N approach (as well as the LED blinking at a rate of Y Hz) can also be applied to protocols in packet-based networks or data transfer systems in which data is transmitted in block or units of defined or fixed length.

As discussed above, received protocol frames can be completely filtered out because there is generally less control over how many protocol frames arrive at a port and/or the rate at which protocol frames arrive at a given port. Because the transmit rate is controlled and generated by the local CPU, these frames can be counted instead, thus providing a regular "heart beat" that the protocols are running. Thus, in some embodiments, protocol frames received at a given port can be counted and the LED turned on and off when a predetermined count value (e.g., 128) is reached. Further, under typical "healthy" network conditions, the 128 value for either the received protocol frame count or for N above can cause the LED to blink once every 4 to 5 seconds when no other data is on the link, subject to network operating frequency.

Figure 6:
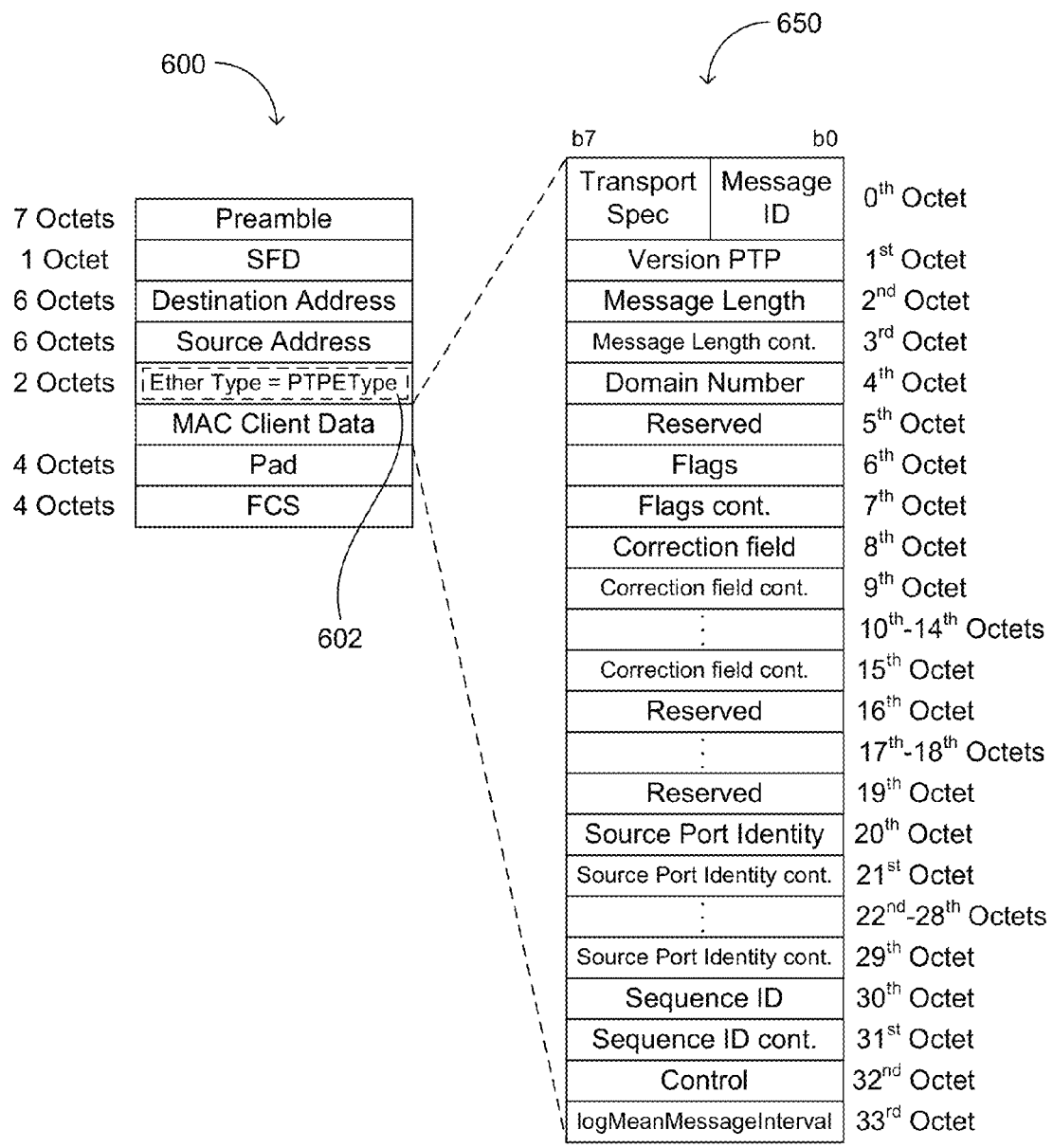
FIG. 6 illustrates an example layer 2 frame format for timing protocol detection.
Figure 7:
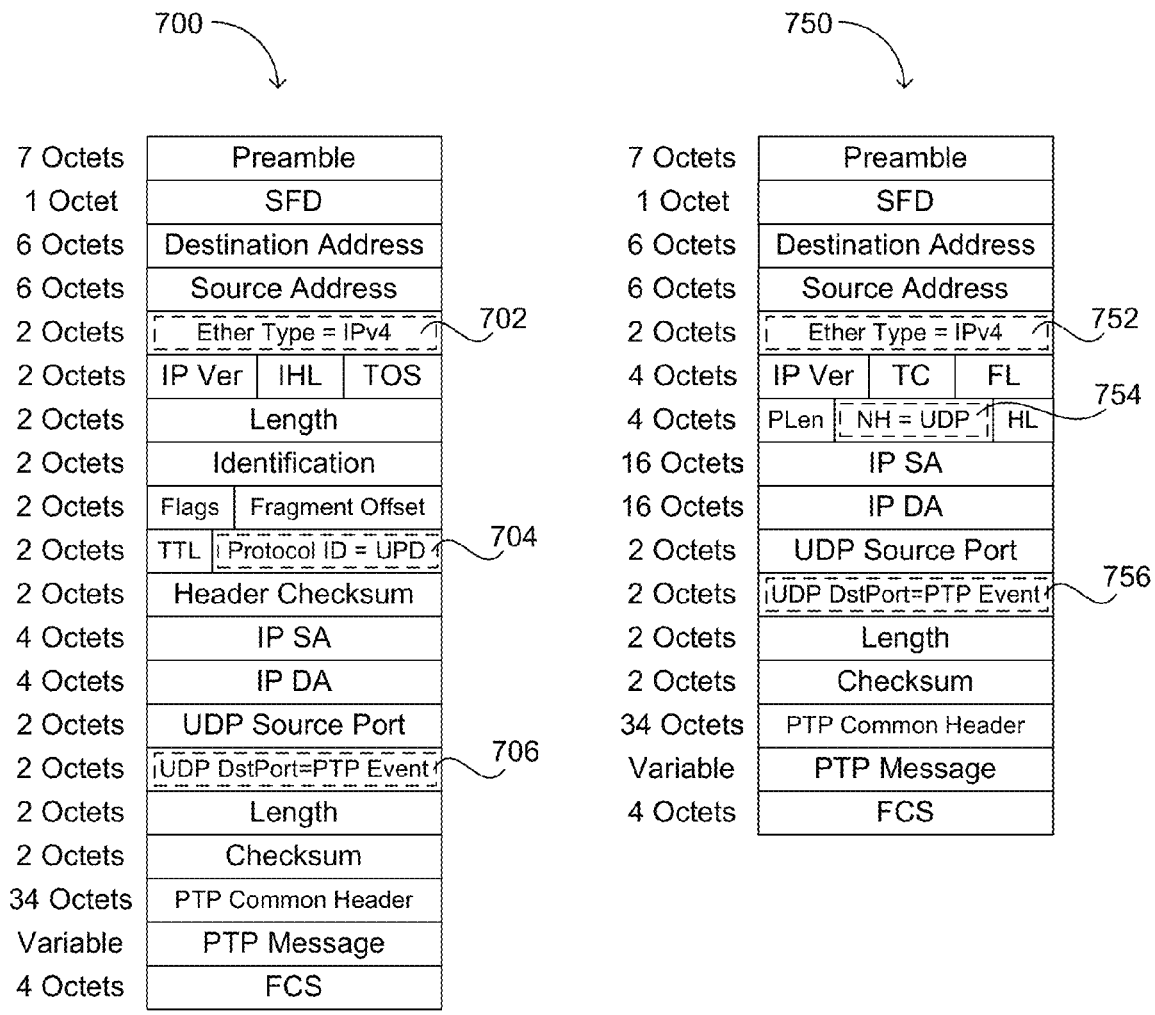
FIG. 7 illustrates an example layer 4 frame format for timing protocol detection.

FIGS. 6 and 7 illustrate examples 600 and 700 of timing protocol frames for purposes of LED activity filtering. FIG. 6 illustrates an example layer 2 frame format for timing protocol detection, and FIG. 7 illustrates an example layer 4 frame format for timing protocol detection. In FIG. 6, a PTP over Ethernet frame format 600 is shown, with a PTP common header 650. The PTP timing protocol can be determined by inspecting field 602 (e.g., Ether Type=PTPEType=0x88F7). For example, field 602, or a predetermined portion thereof, can be provided at signal 404 by data unit parser 402, as shown in FIG. 4.

In FIG. 7, a PTP over IPv4 and user datagram protocol (UDP) frame 700 and a PTP over IPv6 and UDP frame 750 are shown. The PTP timing protocol can be determined for frame 700 by inspecting field 702 (e.g., Ether Type=IPv4=0x0800), field 704 (e.g., Protocol ID=UDP=0x11), and field 706 (e.g., UDP destination port=0x013F (PTP event)=0x0140 (PTP general)). For example, fields 702 and/or 706, or predetermined portions thereof, can be provided at signal 404 by data unit parser 402, as shown in FIG. 4. The PTP timing protocol can be determined for frame 750 by inspecting field 752 (e.g., Ether Type=IPv6=0x86DD), field 754 (e.g., Next header=UDP=0x11), and field 756 (e.g., UDP destination port=0x013F (PTP event)=0x0140 (PTP general)). For example, fields 752, 754, and/or 756, or predetermined portions thereof, can be provided at signal 404 by data unit parser 402, as shown in FIG. 4.

Figure 8:
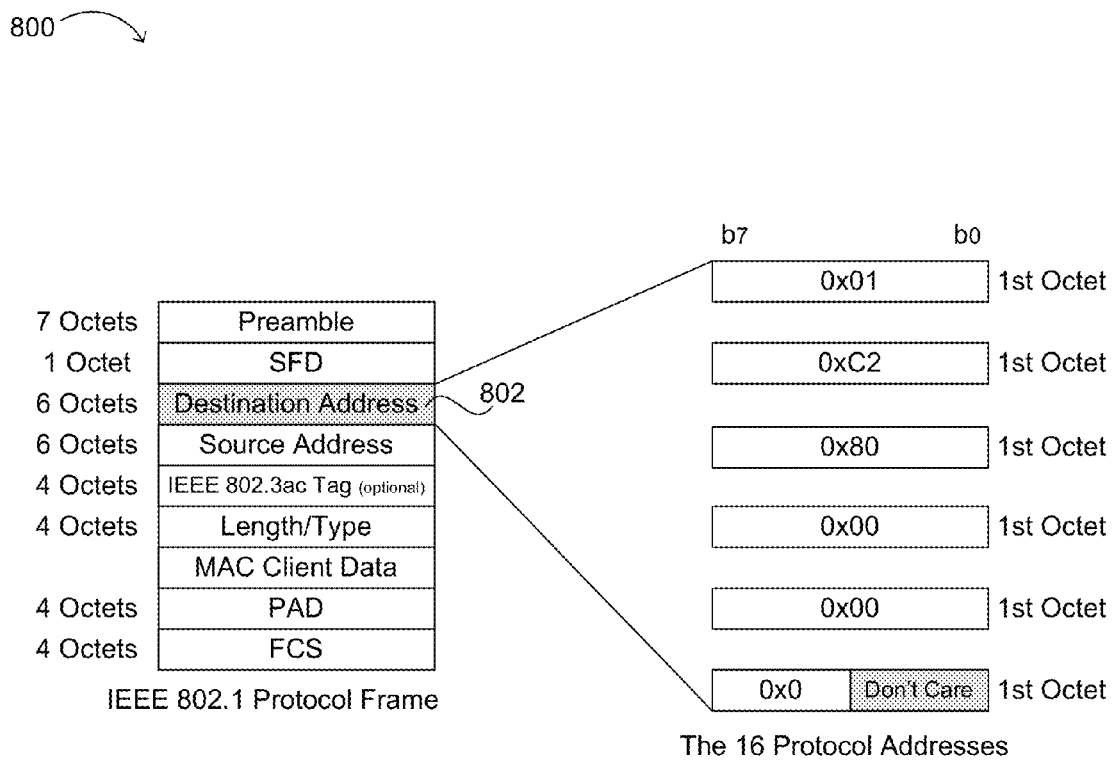
FIG. 8 illustrates an example IEEE 802.1 protocol frame format for protocol detection.

FIG. 8 illustrates an example IEEE 802.1 management frame format 800 for protocol detection. An 802.1 protocol frame can be determined for frame 800 by matching destination address 802 of frame 800 to 0x01:C2:80:00:00:0x. The lower 4-bits of destination address 802 are "don't care" as IEEE 802.1 reserves sixteen consecutive addresses for protocols. For example, destination address 802, or predetermined portions thereof, can be provided at signal 404 by data unit parser 402, as shown in FIG. 4. It is to be noted that the 802.1 management frame format 800 is designed to enable filtering of all existing and future protocol frames.

The filtering logic 420 can be controlled to selectively filter those of the timing protocols and IEEE 802.1 protocol frames that are filtered from the LED's. For example, the filtering logic can be configured (e.g., by a user) to filter a combination of selected timing protocols (e.g., PTP) and existing and current IEEE 802.1 protocol frames. Thus, in some embodiments the filtering logic is configured to filter timing protocols without filtering any IEEE 802.1 protocol frames. In other embodiments, the filtering logic is configured to filter selected IEEE 802.1 protocol frames from the LED's without filtering timing protocol frames. In still other embodiments, the filtering logic is configured to selectively filter a combination of timing protocols and IEEE 802.1 protocol frames. The filtering logic 420 can be controlled to selectively filter those of the sixteen IEEE 802.1 protocol addresses that are filtered from the LEDs. For example, filtering logic 420 can selectively filter all, or some, of the sixteen IEEE 802.1 protocol addresses.

Figure 9:
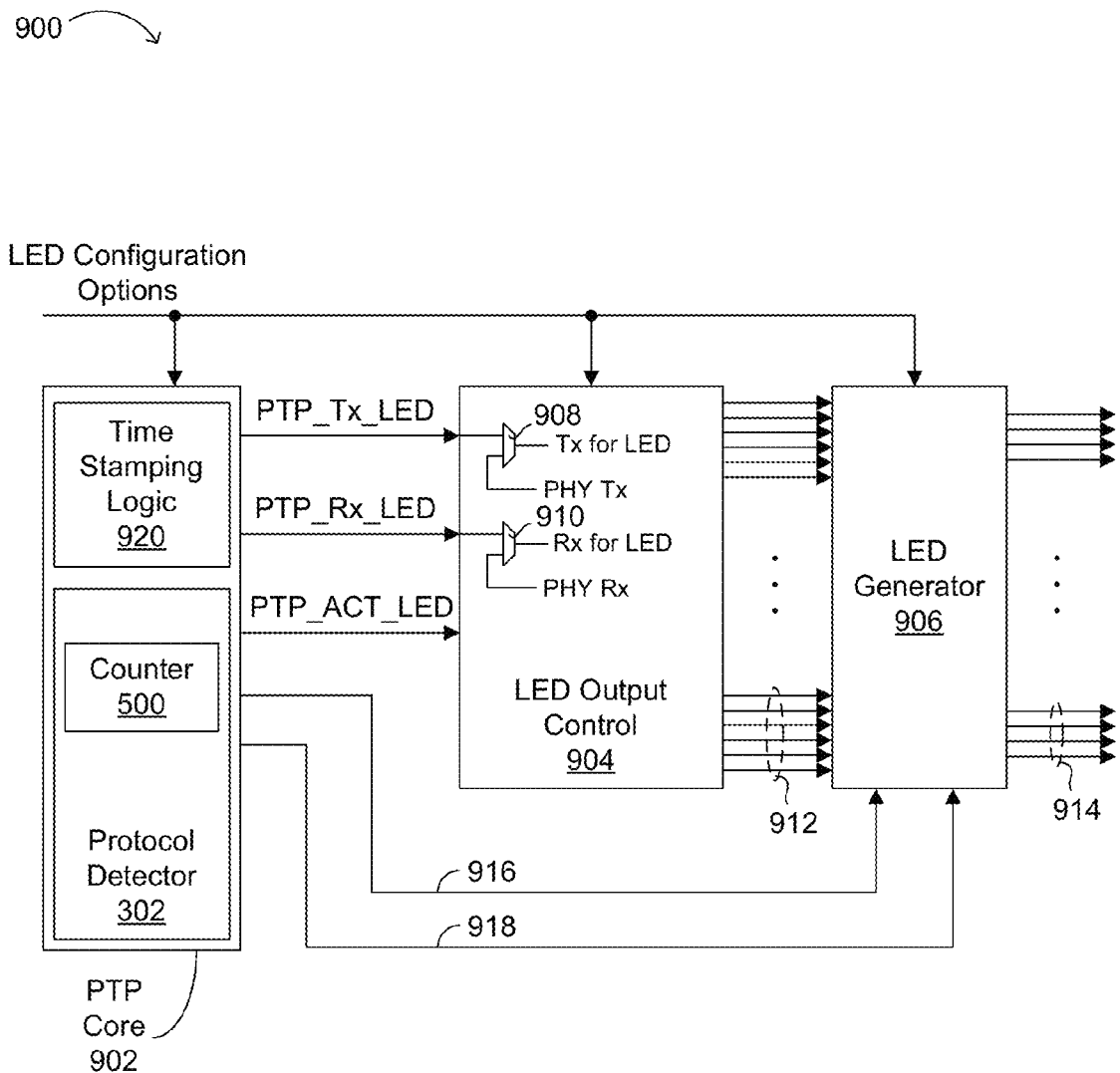
FIG. 9 illustrates an example LED controller arrangement.

FIG. 9 illustrates an example 900 of an LED controller. A PHY, MAC, or other circuit, can be modified from non-protocol related applications to obtain receive and transmit activity from PTP core block 902 instead of from LED output control 904 (for example, via multiplexers 808 and 810 in LED output control block 904). One or more register or configuration bits in the PHY can select between these two modes (e.g., one bit for transmit activity and one bit for receive activity, or one bit for both transmit and receive activity). For example, a multiplexer control register bit in a first state can indicate that all receive (e.g., PHY Rx) and/or transmit (e.g., PHY Tx) frames can contribute to generation of LED activity. However, if the multiplexer control register bit is in a second state, the receive and/or transmit frames are taken through protocol detection logic 302, etc., such that protocol related frames are partially or fully masked out from LED indicator activity, as discussed above. In addition, separate transmit and receive path LED activity, and LED activity as related to protocol frame filtering, can also be controlled via LED configuration options (e.g., as programmed into volatile memory [e.g., one or more registers] and/or non-volatile memory [e.g., EPROM or flash memory configuration bits], either on-chip or off-chip in one or more memory units associated with a CPU controlling part or all of the functionality of the PHY or MAC).

In addition, user-programmable LED configuration options/registers (e.g., for selection of full or partial restriction mode, value of N, etc.), can be supplied to one or more of PTP core 902, LED output control 904, and LED generator 906. For example, the value of N can be supplied, or otherwise provided, to counter 500 in PTP core 902 via the LED configuration options. There can also be separate counters 500 for each of the transmit and receive paths. Additionally, selection of a full or partial restriction mode can be supplied, or otherwise provided, via LED configuration options to protocol detector 302 in PTP core 902. Such configuration options can otherwise locally be supplied within PTP core 902, such as by a local register. In addition, any configuration options or registers as discussed herein can be user-programmable or user-or-manufacturer-optionable in any suitable way (e.g., fuse programming, non-volatile memory, metal-layer optioning, or random-access-memory).

The PTP core block 902 is configured to receive a register value, such as via the LED configuration options, for user programming to select or identify N for the receive and/or transmit paths as described herein. For example, 8 bits can be allocated in the configuration register for the transmit path, and 8 bits can be allocated for the receive path. Default or reset values can be 0x00 to effectively disable protocol detection on the receive path, and 0x80 (N=128) for the transmit path (to enable a partial restriction mode and set the value of N). Any other default value or a default control signal (e.g., reset signal in FIG. 5) can also be used in particular embodiments. One example of the user-programmable configuration register values is as shown below in Table 3.

TABLE 3

| Register Value: | Function: |
| --- | --- |
| 0 | Filter all protocol frames from the LEDs |
| 1 | Do not filter any protocol frames from the LEs |
| N (where N is >1) | Filter all protocol frames with the exception of allowing through 1/N of the protocol frames for LED control purposes |

PTP core 902 can include time stamping logic 920, as well as detection logic (e.g., protocol detector 302) for determining frames that are timing protocol frames and/or IEEE 802.1 protocol frames on either or both of the receive and transmit paths. Time stamping logic 920 is configured to inspect payload or other data in a frame if a given field indicates that the frame is a timing protocol frame or an IEEE 802.1 protocol frame that is selected for filtering, in order to capture the time stamp for timing protocol purposes. If the frame is a timing protocol frame, the captured time stamp can be advanced to a register for further processing (e.g., for timing synchronization, etc.). The PTP_ACT_LED signal can account for either 0, 1, or N timing protocol (PTP) frames on the link (e.g., both receive and transmit), and can be coupled to the LED expansion wires 912 output from LED output control 904. Although six wires 912 are shown, the number of wires or control signals can be any number to support a given LED activation application. For example, expansion wires 912 can be used to provide control signals that convey to LED generator 606 when to activate an LED on a given port, whether the activation is for a solid "on" signal, a blinking signal, etc., where the activation control involves binary signaling (e.g., 6 bits for a single LED activation control). Other types of signaling, control, numbers of signals, etc., can be used in particular embodiments.

The receive (PTP_Rx_LED) and transmit (PTP_Tx_LED) signals can account for all activity on the link, except for the 0, 1, or N protocol frames (transmitted and/or received). Thus, the PTP_Tx_LED signal can convey an indication of each non-protocol frame detected on the transmit path that is to result in an LED activity function (e.g., that is not masked).

Similarly, the PTP_Rx_LED signal can convey an indication of each non-protocol frame detected on the receive path that is to result in an LED activity function (i.e., that is not masked). The PTP_ACT_LED signal can represent non-masked protocol frame activity detected on either or both of transmit and receive paths, and that results in a corresponding LED activity function.

FIG. 9 illustrates a relationship between PTP core 902 and LED output control 904, in turn coupled to LED generator 906 for generation of LED control signals 914. Applications without protocol control would not include PTP core 902 or signals associated therewith. Signals 916 (transmission frames) and 918 (received frames) represent those frames detected as protocol frames, such as those shown in FIGS. 6, 7, and/or 8. Signals 916 and 918 can thus be control signals that indicate detection of protocol frames. Signals 916 and 918 can then be fully or partially masked out at LED generator 906 based on the configuration options, such as when a full restriction mode is enabled, or when the receive path is disabled for LED generation, or the like. In some embodiments, PTP_ACT_LED can represent a combination of signals 916 and 918, where signals 916/918 allow an associated LED to blink only for protocol frame activity.

Figure 10:
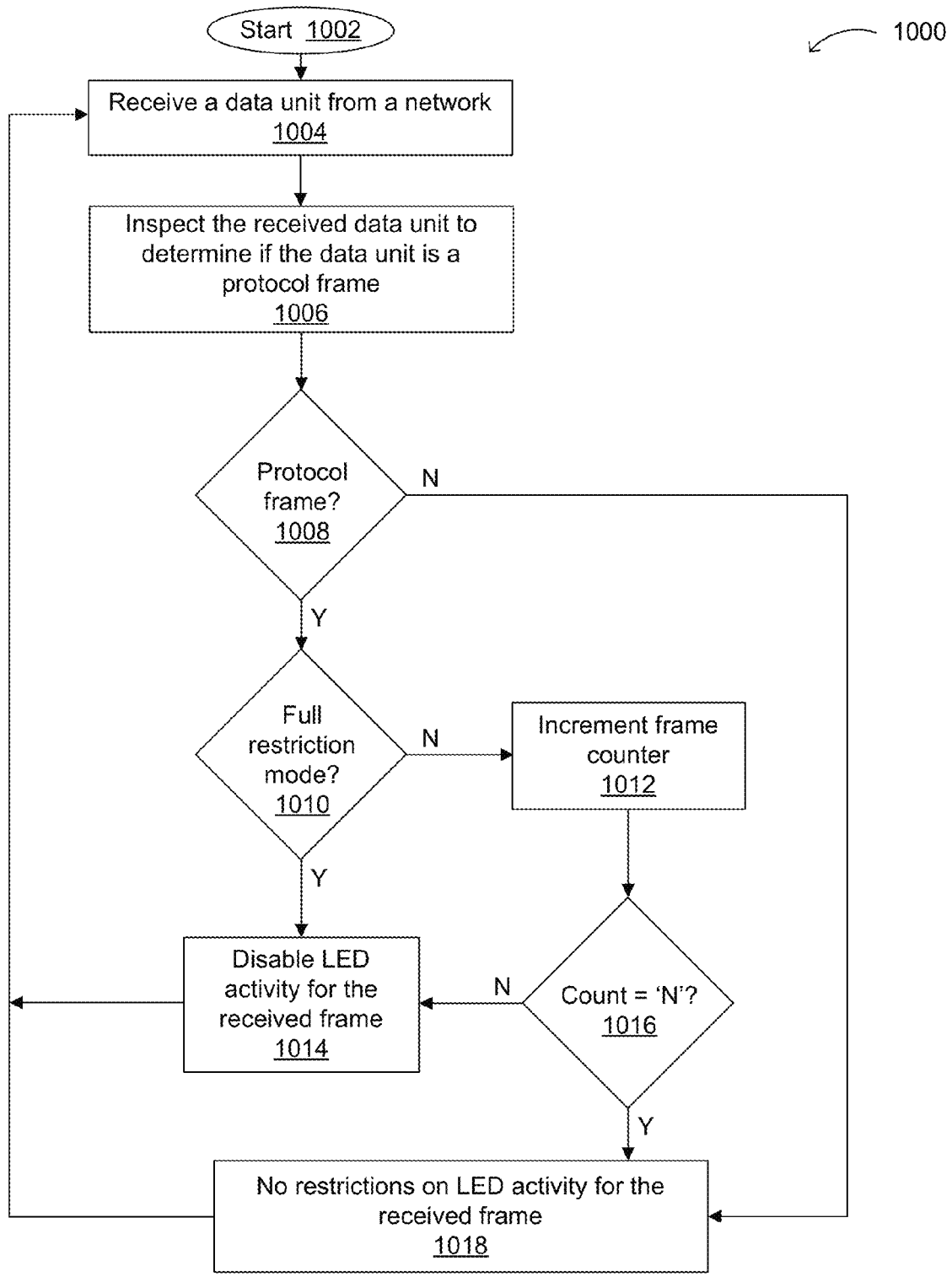
FIG. 10 illustrates an example method of controlling an LED.

FIG. 10 illustrates a method 1000 of controlling an LED. At 1002, the flow begins, and at 1004, a data unit or frame is received from a network. The frame can be replaced by a packet or other data unit of fixed or predetermined length. At 1006, the received data unit or frame is inspected to determine if it is a protocol frame. For example, one or more fields of the frame can be checked against predetermined values to detect whether that frame is a protocol frame that is selected for filtering, such as those fields and frames shown above in the examples of FIGS. 6, 7, and 8. Other forms of frame or packet inspection, such as by using a designated bit or other flag, can also be accommodated in particular embodiments.

At 1008, if the received data unit is not a protocol frame, the frame is treated as a data frame, and at 1018, there are no restrictions on LED generation for the received frame. For example, if an LED is to blink based on receipt of data or control frames other than protocol frames (e.g., at a rate of X as shown above in Tables 1 and 2), this can be allowed to occur for such data traffic. However, if at 1008 the frame is a protocol frame, a determination is made as to which type of restriction mode (e.g., full or partial restriction) is enabled. As discussed above, full or partial restriction mode can be a user selectable option. If at 1010 a full restriction mode is enabled, LED activity (e.g., blinking) is disabled at 1014 for the received data unit. In other words, the full restriction mode fully masks out LED activity corresponding to protocol frames, such as timing protocol frames as well as other existing or future IEEE 802.1 protocol frames that are selected for filtering. This option leaves data or other control frames, as well as link establishment, to determine and/or cause LED activity.

At 1010, if the partial restriction mode is enabled to allow some indication of protocol operation, at 1012, a frame counter can be incremented. Alternatively, the frame counter can first be initialized to a predetermined value, and subsequently decremented instead of incremented. At 1016, proceeding with the counter incrementing example, if the count is equal to the programmed or predetermined count value of N, at 1018, no restrictions are placed on LED activity for the received frame. However, at 1016, if the count is not equal to the program count value of N, at 1014, LED activity is disabled for the received frame. Thus, only 1 out of every N protocol frames detected results in corresponding LED activity. This effectively slows down the LED blinking rate (see, e.g., blinking rate Y in Table 2) to provide a "heart beat" type indication of protocol activity.

One or more of the techniques described above can be performed by one or more programmable processors executing a computer program to perform functions by operating on input data and generating output. Generally, the techniques can take the form of an entirely hardware embodiment, an entirely software embodiment, or an embodiment containing both hardware and software components. In one implementation, the methods are implemented in software, which includes but is not limited to firmware, resident software, microcode, etc. Furthermore, the methods can take the form of a computer program product accessible from a computer-usable or computer-readable medium providing program code for use by or in connection with a computer or any instruction execution system.

For the purposes of this description, a computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Although the subject matter has been described in language specific to structural features and/or methodological techniques and/or acts, it is to be understood that the subject matter defined in the appended claims is not necessarily limited to the specific features, techniques, or acts described above, including orders in which they are performed.

What is claimed is:

1. A method comprising:
   receiving a data unit from a network;
   determining whether the received data unit is a protocol control unit;
   disabling activity of a status indicator if the received data unit is determined to be the protocol control unit; and
   allowing activity of the status indicator if the received data unit is determined to be data other than the protocol control unit.

2. The method of claim 1, wherein the determining further comprises determining that the received data unit is the protocol control unit if the received data unit is a type of protocol control unit that is selected for filtering.

3. The method of claim 2, further comprising enabling a user to select the type of protocol control units to filter.

4. The method of claim 1, wherein the determining whether the received data unit is the protocol control unit further comprises accessing a field in a predetermined position of the received data unit to determine whether the received data unit is the protocol control unit.

5. The method of claim 1, wherein the determining whether the received data unit is the protocol control unit comprises determining whether the received data unit is a timing protocol unit.

6. The method of claim 1, wherein the determining whether the received data unit is the protocol control unit comprises determining whether the received data unit is an IEEE 802.1 protocol frame unit.

7. The method of claim 6, wherein the determining whether the received data unit is the protocol control unit further comprises accessing a destination address of the received data unit to determine whether the received data unit is the IEEE 802.1 protocol frame unit that is selected for filtering.

8. The method of claim 1, wherein the determining whether the received data unit is the protocol control unit comprises determining whether the received data unit is a timing protocol unit or an IEEE 802.1 protocol frame unit.

9. The method of claim 1, wherein the status indicator comprises a light-emitting diode (LED).

10. The method of claim 9, wherein the activity of the status indicator includes turning on the LED or blinking the LED.

11. The method of claim 1, wherein the allowing activity of the status indicator further comprises directing the activity of the status indicator at a first rate if the received data unit is determined to be data other than the protocol control unit.

12. The method of claim 1, further comprising:
    changing a count value in response to the received data unit being determined to be the protocol control unit; and
    wherein the disabling the status indicator comprises disabling the status indicator when the count value is not equal to a predetermined value.

13. A controller comprising: a receiver configured to receive a data unit from a network; a processor and a memory configured to implement logic configured to: determine whether the received data unit is a protocol control unit; disable activity of a status indicator if the received data unit is determined to be the protocol control unit; and allow the activity of the status indicator if the received data unit is determined to be data other than the protocol control unit.

14. The controller of claim 13, wherein the logic configured to determine whether the received data unit is the protocol control unit further comprises logic configured to determine that the received data unit is the protocol control unit if the received data unit is a type of protocol control unit that is selected for filtering.

15. The controller of claim 13, wherein the logic configured to determine whether the received data unit is the protocol control unit further comprises logic configured to determine whether the received data unit is an IEEE 802.1 protocol frame unit.

16. The controller of claim 15, wherein the logic configured to determine whether the received data unit is the protocol control unit further comprises logic configured to access a destination address of the received data unit to determine whether the received data unit is the IEEE 802.1 protocol frame unit that is selected for filtering.

17. The controller of claim 13, wherein the logic configured to determine whether the received data unit is the protocol control unit further comprises logic configured to determine whether the received data unit is an IEEE 802.1 protocol frame unit or a timing protocol unit.

18. The controller of claim 13, wherein the logic configured to disable the activity of the status indicator further comprises:
    a counter configured to change a count value in response to the received data unit being determined to be the protocol control unit; and
    wherein the logic is configured to disable the status indicator when the count value is not equal to a predetermined value.

* * * * *